Figure 1:
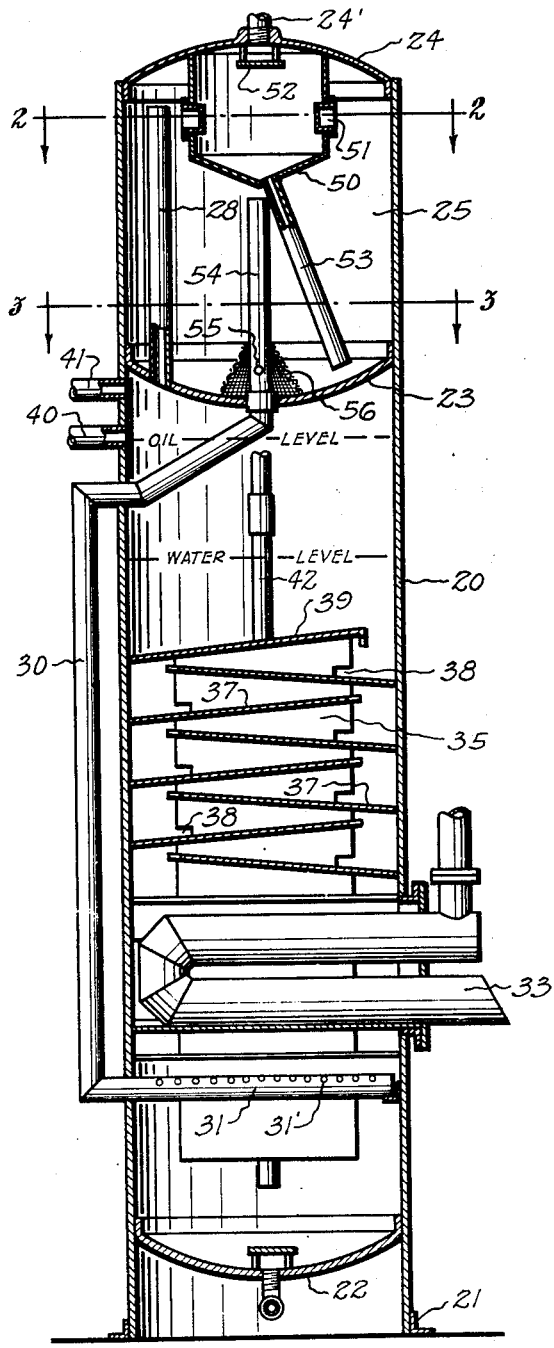

Sept. 23, 1941.   J. P. WALKER   2,256,695
TREATMENT OF OIL, WATER, AND GAS MIXTURES
Filed Dec. 17, 1937   3 Sheets-Sheet 1

Inventor
Jay P. Walker

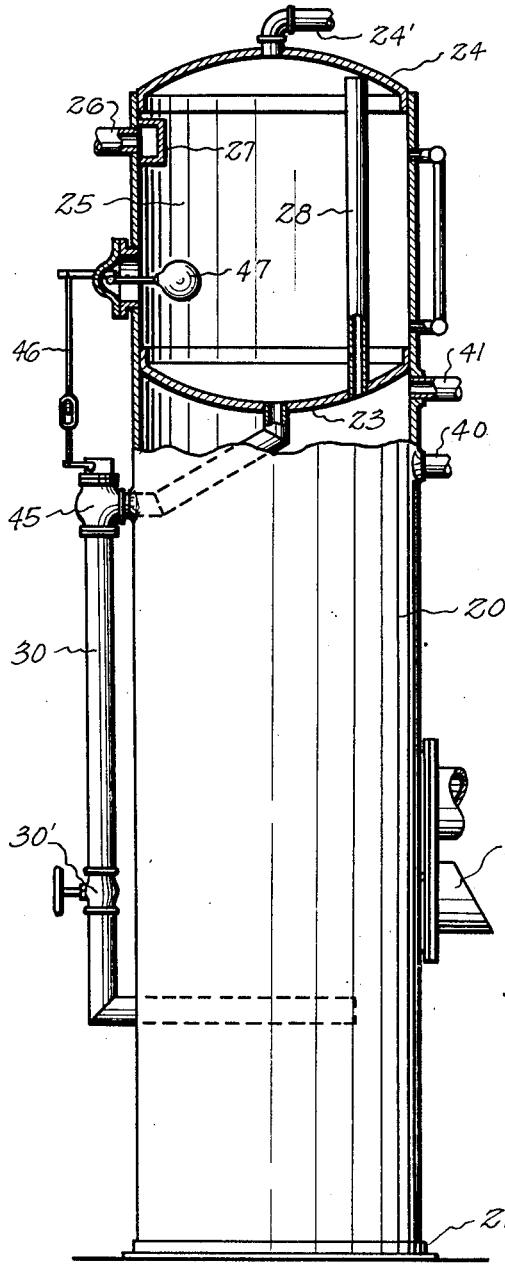

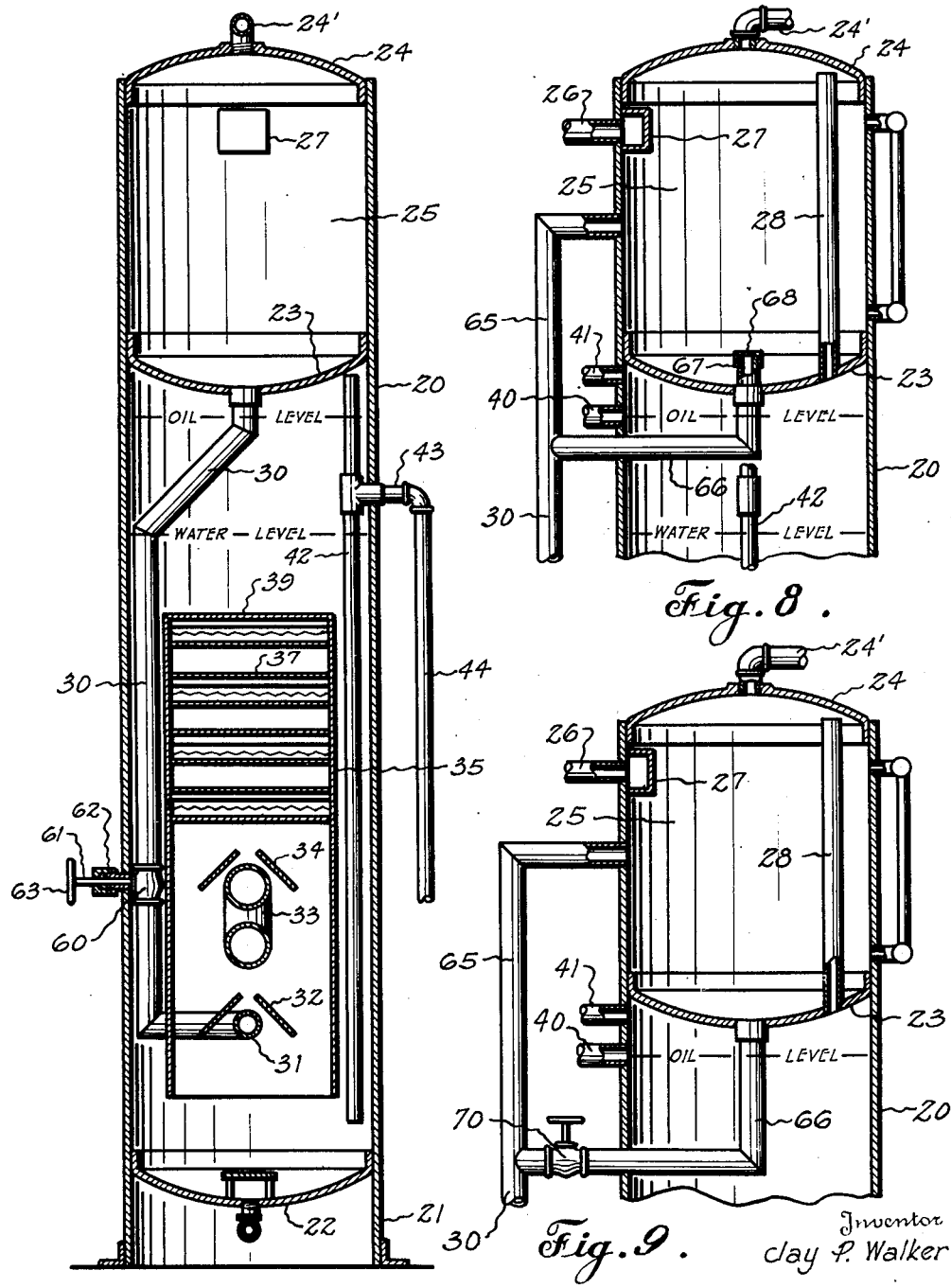

Patented Sept. 23, 1941

2,256,695

UNITED STATES PATENT OFFICE 2,256,695

TREATMENT OF OIL, WATER, AND GAS MIXTURES

Jay P. Walker, Tulsa, Okla., assignor of forty per cent to Guy O. Marchant and six per cent to C. G. Wells, both of Tulsa, Okla.

Application December 17, 1937, Serial No. 180,457

6 Claims. (Cl. 183—2.7)

This invention relates to new and useful improvements in the treatment of oil, water and gas mixtures.

This application is filed as a continuation in part of my co-pending application filed July 27, 1936, Serial Number 92,902.

One object of the invention is to provide an improved apparatus for treating oil, gas and water mixtures or emulsions in an efficient and economical manner and with minimum losses of the desirable gaseous fluids.

An important object of the invention is to provide an improved treating apparatus including a receiving or surge chamber or container into which the well influent is introduced together with means for controlling or regulating the flow of liquids from said chamber whereby a substantially steady discharge therefrom may be maintained under normal conditions; the influent being at normal well-flowing temperatures or being preheated; and gas being separated from the mixture in the chamber, if desired.

A further object of the invention is to provide an improved apparatus of the character described including a receiving or surge chamber of such capacity as to receive and momentarily store an excessive flow of the well influent as from a surging well, together with means for regulating the discharge of fluid from the said chamber to the dehydrating unit or chamber, whereby such excessive flows will not disturb the regular and normal operation of the apparatus.

Another object of the invention is to provide means for manually controlling or regulating the discharge flow from the receiving chamber to the dehydrating chamber, whereby the operation of the apparatus may be controlled or regulated in accordance with flowing conditions and the desires of the operator.

Still another object of the invention is to provide an improved treating apparatus wherein the comparatively cool influent is received in a chamber having its bottom exposed to the hot vapors or gaseous fluids rising from the heated liquids in the chamber below, whereby, together with improved means for positively accumulating a stratum of liquid on said bottom, such fluids will, to some extent, condense upon contacting said cooler bottom and drop some of their condensible components, which will be admixed with the oil, thus enriching it.

A construction designed to carry out the invention will be hereinafter described, together with other features of the invention.

Figure 2:
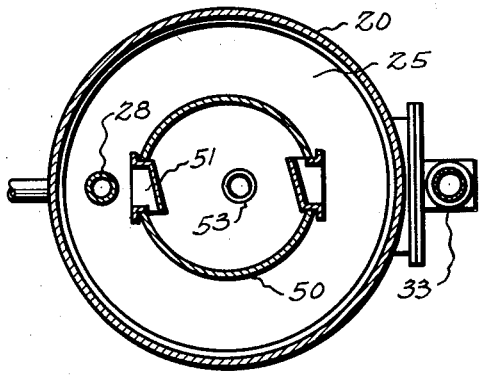
Figure 3:
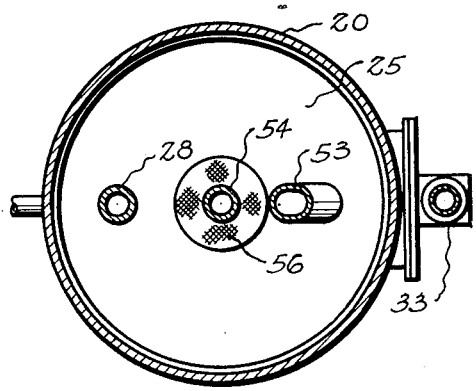

The invention will be more readily understood from a reading of the following specification and by reference to the accompanying drawings, in which an example of the invention is shown, and wherein:

Figure 1 is a view, partly in section and partly in elevation of a treating apparatus, constructed in accordance with the invention, Figure 2 is a horizontal, cross-sectional view taken on the line 2—2 of Figure 1, Figure 3 is a horizontal, cross-sectional view taken on the line 3—3 of Figure 1, Figure 4 is a view of another form in which the invention may be carried out, partly in elevation and partly in section, Figures 5 and 6 are horizontal, cross-sectional views of the upper and lower portions of the treater shown in Figure 4, and Figures 7, 8 and 9 are vertical, sectional views of portions of three different forms of apparatus made in accordance with the invention.

In the drawings, the numeral 20 designates an upright cylindrical tank of the usual construction, such as is used in the building of oil and gas separators. The tank is provided with a suitable base 21 and false bottom 22. A dished head 23 is secured within the tank near the upper end thereof, while the extreme upper end of said tank is closed by a crowned cap or top 24. The members 23 and 24 seal off the upper portion of the tank, and as is obvious by observing Figure 1, are spaced from each other so as to form a receiving or surge chamber or container 25 therebetween.

The receiving chamber 25 is made large enough to store a considerable quantity of the well stream. Wells as a rule do not flow steadily and many have a tendency to head or surge, thus causing an excessive flow into the receiving chamber. The chamber 25 thus becomes a sort of reservoir for receiving and storing the well influent whereby the liquids to be further treated may be delivered to the washing and separating elements at a controlled, or more or less steady rate of flow. While the chamber 25 has been shown as a part of the upright tank, it may be a separate and individual container and the tank need not be upright.

An inlet pipe 26 (Fig. 4) extends through the wall of the chamber 25 at the upper end thereof and discharges into a diverter box 27, whereby the influent is caused to take a circumferential course around the inner wall of said chamber. The influent may, or may not, be preheated. The circumferentially flowing influent is scrubbed on the wall of the chamber 25, whereby the gaseous fluids are liberated and rise, while the liquids take a downward course. A gas outlet pipe 24' is connected in the top 24. A vertical gas-pressure equalizing pipe 28 is mounted in the head 23 and extends upwardly within the chamber 25. The pipe is preferably located at one side of the head and may have its upper end terminating just below the top 24, whereby a communication is established between the chamber 25 and the upper portion of the tank 20 below the head 23.

The well stream will enter the chamber 25 under well flowing pressure, and may whirl around the chamber under more or less velocity. The free gas and more or less of the gas in solution, will be liberated. Ordinarily this separated gas will be discharged through the pipes 24', which has a pressure valve (not shown) therein, so as to hold a predetermined pressure within the chamber. The pipe 28 serves as a gas pressure equalizing medium, and will permit gas to flow up from the tank below the chamber and into said chamber or vice versa, according to the pressures in the chamber and in the tank.

A discharge or liquid conducting pipe 30 is connected in the bottom 23 of the chamber 25. The pipe 30 extends down into the tank a short distance (Figure 1) and is offset so as to extend outwardly through the side wall of the tank, and then downwardly preferably in close proximity to the wall of the tank. The lower end of the pipe 30 is connected to a nozzle 31 which extends through the wall of the tank and diametrically across the lower end of the tank. This nozzle is usually placed a suitable distance above the bottom 22, to provide a water settling and collecting space therebelow, in which extraneous matter may also deposit. The nozzle preferably has longitudinal rows of perforations 31' on its upper side, so as to discharge the liquid mixture upwardly in numerous small streams spaced transversely or diametrically of the tank. The tank contains a body of water, usually salt water, up to a certain level which is maintained by a syphon pipe 42 (Figure 7) vented at its upper end. This pipe takes water from the bottom of the tank and has an outlet pipe 43 connected thereto and extending through the wall at a point above the water level, because of the hydrostatic head in the tank. A water leg or discharge pipe 44 is connected to the pipe 43. This is a common construction and no claim is made thereto.

Any suitable washing or dehydrating means may be used in the tank and may be either wholly or partially immersed in the body of salt water for separating the water from the oil. I have illustrated a unit or separator similar to that shown in my co-pending application Serial Number 100,577, filed September 12, 1936, issued as Patent No. 2,181,688, dated November 28, 1939, wherein the body of salt water is heated and the mixture discharged from the nozzle 31 is baffled upwardly therethrough to extract and precipitate the water from the mixture.

In the drawings (Fig. 7) inclined baffles 32 are shown above the nozzle and a return-bend fire box 33 is mounted across the tank just above said baffles in alinement with the nozzle. The small upwardly flowing streams are directed by the baffles against the bottom of the lower leg of the fire box and flow upwardly on each side thereof, whereby they are heated. Similar inclined baffles 34 overhang the fire box and keep the upwardly flowing streams in heating contact therewith. It is within the scope of the invention to heat the body of salt water by a suitable means or to supply heated salt water to the tank. Any suitable heating element may be introduced into the lower leg of the fire box.

The skirts of a vertical housing 35 extend on each side of the fire box and nozzle, whereby vertical passages or ducts 36 open at their upper and lower ends are formed with the wall of the tank. Above the fire box staggered upwardly inclined cross baffles 37 are mounted in the housing and may have their free ends serrated to divide the upwardly flowing liquids into numerous small streams. Adjacent the lower ends of the baffles 37, the vertical edge portions of the side walls or skirts of the housing 35, are notched to form outlets 38 above the baffles, whereby the segregated or separated water which flows down the said baffles may escape into the vertical passages or ducts 36. It will be seen that as the emulsion mixture flows upwardly it will be constantly washed in the body of heated water in the housing, so that it becomes a part of, and commingles with said water body and is heated thereby. The oily content is constantly tending to rise and tends to flow along the undersides of the baffles 37, so that as the water is settled out or precipitated, such water flows down the inclined upper sides of the baffles, escapes, with portions of the body of heated water, through the outlets 38, into the ducts 36. The water flowing in the ducts 36 is moving downwardly, while the flow in the housing is upwardly, consequently there is no counter-current flow either in the housing 35 or in the ducts 36.

By the time the mixture reaches the top 39 of the housing the entrained water will be substantially washed out of the oil and water mixture and the clean oil will rise and float upon the body of water up to the oil level. The water which flows into the ducts 36, from all sources flows downwardly cooling somewhat, and finally admixing with the water in the bottom of the tank, whereby the water may be recirculated. The counter-flows in the housing and ducts, coupled with the temperature differentials, set up a thermo-syphonic action which promotes circulation as clearly pointed out in my co-pending application.

An oil discharge pipe 40 leads from the tank at the oil level. The hot oil discharged through this pipe may be carried through a heat exchanger, so as to heat the well influent before it enters the pipe 26, and to cool said oil, or it may be otherwise disposed of. The oil will be discharged substantially free of water and little or no emulsion.

The heated oil will give off more or less vapors or gaseous fluids, but not to such an extent as it would if the free gas and some solution gas had not been removed ahead of secondary heating. These vapors will rise and upon contacting the bottom 23 of the receiving chamber 25, much of their heavier constituents will condense, the condensate falling back into the oil and enriching it. In this manner rich vapors which would otherwise be lost are saved and remixed with the oil. A gas outlet pipe 41 extends from the tank above the oil outlet 40 and below the bottom 23. Gas and gaseous fluids which are not condensed may escape through this pipe which may have a suitable valve (not shown) therein; or gas and vapors may flow up through the pipe 28, to mingle with the gas in chamber 25, and there be cooled when mixed with incoming cooler gases and thereby be further condensed and robbed of their heavier ends or constituents, such ends being high gravity oil or gasoline and as and when they become liquid they precipitate and are admixed with the liquids in that chamber.

The control or regulation of the flow of liquids from the chamber 25 through the pipe 30 is very important. Gauges are usually mounted on the chamber and tank and the operator may tell at a glance the conditions within the chamber and tank; therefore, the control or regulation of the flow makes for more efficient operation, as the heater or heated liquid is not thereby taxed beyond its heating power at any time, and thereby surging or heading type flowing wells are not permitted to flow volumes through the heating chamber and emulsion breaking chamber in excess of the capacity of said heater or heated liquid to break down the emulsion and later precipitate the water therefrom.

While the liquid level in the chamber 25 and the discharge therefrom, may be determined in Figure 4 by regulating the valve 30', it may also be held by a float 47 mounted in the chamber as is shown in Figure 4. The float is connected by a linkage 46 with a valve 45 connected in the pipe 30, exteriorly of the tank, said pipe 30 being disposed slightly differently in this figure. With this arrangement the rise and fall of the liquids in the chamber opens and throttles the valve 45, thereby maintaining a level. The valve 30', however, is still used to control the flow in addition to the valve 45, and thereby it still may feed the liquid to spreader 31 at a predetermined rate.

In the upper part of the chamber 25 a gas scrubbing shell 50 is suspended from the top 24 and provided with inlet louvers 51 and a baffle 52 below the inlet to the gas escape pipe 24', and these may also be used in Figures 1, 2 and 5. A drain pipe 53 inclines downwardly from the bottom of the shell to carry the extracted liquids from the scrubbing shell to the bottom of the chamber. This arrangement makes for a more efficient scrubbing of the vapors or gaseous fluids.

A stand pipe 54 open at its upper end, is mounted axially in the chamber 25 and liquids may overflow into the upper end thereof whenever they reach such a level. A small hole or orifice 55 is provided in the pipe above the bottom 23 of the chamber 25. During normal flowing conditions of the well sufficient liquid will drain through this hole to maintain a low level of liquid in the chamber, and due to the fact that orifice 55 is slightly above the bottom head a quantity of cooler fresh liquid will be constantly maintained in chamber 25, but should the well head or surge, whereby an excessive amount of influent is delivered to the chamber, the liquid level will rise much higher therein, so that the excess liquid may overflow into the pipe 54. The hole or orifice 55 provided is, of course, of a known and predetermined size so that its capacity to allow fluids to pass through is not greater than the capacity of the heating chamber to heat and break up the emulsions and precipitate the water therefrom and since pipe 54 may be of sufficient length to permit liquids to build up in volume greater than the total head surge flow of the well before any liquids run over the open upper end of pipe 54, then will all the liquid fed to the heating chamber through orifice 55, pipe 30 and spreader 31 be never more than the heating chamber capacity. But as a safety measure and in the event that at some period the head surge flow would be unusually large and of such volume as to otherwise flood the gas separating space, were there no other outlet to the heating chamber the pipe 54 has its upper end open and this excess flow may flood down through the treater through 54, 30 and 31 and not flood out through the gas vent, and thus only exceptional and occasional over capacity conditions could arise.

Another and most important function of controlling the flowing or surging wells is to maintain at all times at least some amount of the incoming cooler liquid in the bottom of chamber 25, particularly for the purpose of cooling the gases rising from the heated oil level below. It is to be noted that in the event that the surging or heading well should flow or expel large amounts of liquids periodically and at long intervals between flows, then since the discharge pipe 30 in all cases must be fairly large to accommodate the amount of liquid being produced, the chamber 25 during much of the time would be dry or devoid of cool liquid and the gases rising from below would not be cooled nor condensed.

The maintenance of cool liquid in chamber 25 is exceedingly important and any means either automatic or manually operated should be supplied to secure the results in question. The orifice 55 and the pipe 54 coact with the bottom 23 to provide a cooled condensing area for the heated gases and this being a very important item in maintaining the highest possible gravity of the oil, some means must be provided for this purpose.

In other cases where wells flow steady the head 23 would be continuously cooled by constantly flowing new cooler liquids but in the event of heading wells, and many wells do flow by heads, the automatic or manual liquid controls are essential for the prime reason of definitely assuring a cool surface for a condensing zone and secondarily to serve as a safety feeder to the heating chamber. A frusto-conical screen 56 is mounted around the bottom of the pipe 54 to prevent extraneous matter clogging the orifice 55. The apparatus may otherwise be the same as has been described.

In operation, the well fluids are first directed into the chamber 25, wherein a portion of the gas is scrubbed from the influent. The liquids are then conducted to the treating unit through the pipe 30. It is pointed out that the flow from the chamber 25 to the nozzle 31 is controlled by the orifice 55. The provision of this orifice in the line is an important feature of the invention, in that it positively provides for an even and continuous flow to the nozzle 31. Therefore, the chamber 25 not only serves as a separating chamber wherein a portion of the gas is scrubbed out from the influent, but also acts as a surge chamber. This is true because regardless of the flow of the influent into the chamber 25, the flow of the oil and water mixture to the nozzle is maintained constant. Therefore, if the well is heading, or flowing in gushes, the influent will enter the chamber 25 unevenly. This uneven flow does not effect the discharge of the oil and water mixture from the nozzle 31, because the valve 30' may be adjusted properly so as to choke the flow through the line 30, whereby surging or heading of the well is not manifested in the discharge from the nozzle.

The oil and water mixture passing from the nozzle will flow upwardly into the housing 35 and the water and oil will thus be separated so that the oil which rises to the oil level will pass out through the outlet pipe 40. The hot vapors which rise from the hot oil, within the tank will contact the underside of the head 23 of the chamber 25. This bottom is much cooler because of the temperature of the influent in the chamber 25 and, therefore, will cause the vapors to condense, and the condensate will drop into said oil, whereby they are remixed with the oil. It is this remixing of the released vapors with the oil which builds up the specific gravity of the oil to approximately its original gravity. Some of the hot gases will escape upwardly through the pipe 28 and this portion of the gases will contact the comparatively cool gases in the chamber 25, whereby they are cooled thereby. This cooling causes condensation of the hot gases whereby their higher volatiles or liquid content is dropped into the water and oil mixture in the chamber 25. Some of the gases will escape through its outlet 41.

In some instances it might be feasible to omit any gas separating step in the chamber 25, as the gas could be extracted before the liquids were delivered to the said chamber. In such event, the diverter box 27 could be dispensed with and also the scrubbing chamber.

While the minimum liquid level under operating conditions, in Figure 1, is determined by the elevation of the orifice 55, such liquid level may be determined or controlled by a float 47 mounted in the chamber, as shown in Figure 4. The float is connected by a link 46 with a valve 45 connected in the pipe 30, exteriorly of the tank, said pipe 30 being disposed slightly differently in this figure of the drawings. The rise and fall of liquids in the chamber swings the float, thus opening and throttling the valve 45. This float arrangement operates to normally maintain a liquid level between an extreme lower plane and an extreme upper plane, and the liquid level at or between these bounds is referred to as the normal liquid level, meaning the level of the liquid under normal flow conditions. When the liquid level goes above the upper limit of this normal range, it goes to an abnormal level. The term "normal liquid level" as used herein covers the level of the liquid under normal flowing conditions. It is obvious that the size of the orifice 55, the adjustment of the link 46, and the adjustment of the valve 30', may be varied and thus control the rate of flow of liquid from the chamber. It may also be said that the normal liquid level is more or less constant, because the rate of flow into the tank and out of it may stabilize to such a degree, that the liquid level will remain substantially at one level.

Further illustrating another structure embodying the invention, Figure 7 shows the liquid conducting pipe 30 as extending down inside the tank and through the vertical space between the tank wall and the housing 35. A valve 60 connected in this pipe serves the same as valve 30'. The stem 61 of the valve extends through a stuffing box 62 and has a handle on the outside of the tank, so that the operator may adjust said valve.

In Figure 8, an overflow pipe 65 leads from the side of chamber 25 at the overflow level, similar to the pipe 54, Figure 1, and is connected to the pipe 30 which is outside of the tank. A drain pipe 66 extends from the bottom 23 of the chamber 25, to the pipe 30, similarly to Figure 1. The upper end of the pipe 66 projects above the bottom and has a cap 67 thereon. The cap has an orifice 68 similar to orifice 55 of Figure 6, whereby a head of liquid is carried on the bottom 23 and keeps the latter covered and relatively cool. Figure 9 is similar to Figure 8 except that the pipe 66 leads from the bottom 23, as in Figure 1, and a hand valve 70 is connected in the pipe outside of the tank.

Reference has been made to my Letters Patent No. 2,181,688, which involves the thermo-syphon washing system. Applicant also has Patent No. 2,181,685, which contains method and structural claims dominating the present application, but not directed to structural details or the mechanisms covered by the claims herein.

What I claim and desire to secure by Letters Patent, is:

1. A separator for oil, gas and water mixtures including, a receiving container having an influent inlet, a conductor extending exteriorly from the container, a valve connected in the exterior portion of the conductor and having liquid-responsive means in the container connected to it for regulating the flow of liquids from the container and maintaining a substantially constant liquid level therein and also for compensating an excessive influx of influent into the container, a tank, said conductor discharging into the lower portion of said tank, said tank containing a body of artificially heated water into which the liquids from the conductor are discharged, a separating unit in said tank and in said body of water for washing said influent liquids and extracting the water therefrom, means for providing a water level in said tank, means for discharging water from said tank, and means for discharging oil from the tank above the water level.

2. A separator for oil, gas and water mixtures including, a receiving chamber of sufficient capacity to store an excessive surge of well influent, an inlet for the well influent to the chamber, means in the chamber for scrubbing the gaseous fluids, a gas outlet in the top of the chamber, a conductor for carrying the influent liquids from the chamber, an upright overflow pipe in the chamber connected to the conductor and having an inlet orifice near the bottom of the chamber for maintaining an accumulation of liquid in the bottom of said chamber and for regulating the flow of liquids from the chamber to maintain substantially a constant liquid level and for relieving an excessive influx of influent received in the chamber, a tank having its upper end exposed to the bottom of the chamber, the conductor discharging the oil and water mixture into the tank, means in the tank for extracting water, means for carrying off the extracted water, and means for carrying off the oil.

3. A separator for oil, gas and water mixtures including an upright tank having a transverse head spaced a sufficient distance below its top to form an elongate upright gas separating chamber at its upper end, an influent inlet in the side wall of the separating chamber of said tank near the top of said chamber, means in said chamber for scrubbing gas out of the influent to produce substantially a liquid mixture, a gas outlet from said chamber, a gas equalizing pipe mounted in the bottom of the chamber and extending to near the top of said chamber, a relatively small conductor extending from the head of the tank downwardly to the lower portion of said tank, an upright overflow pipe extending upwardly in the chamber of the tank from the conductor and having an inlet orifice near the said head of such size as to regulate the normal flow of liquid through said conductor and to maintain an accumulation of liquid on said head to cool the same, said overflow pipe acting to discharge an excessive inflow of oil, gas and water influent from the chamber, means for maintaining a body of hot water in the tank, means for discharging the liquids from the conductor into said body of hot water, means for discharging hot oil from the tank at such an elevation as to maintain a body of hot oil floating upon the body of water, whereby the gaseous vapors arising from the body of hot oil are condensed against the cool head of the tank and the condensate is precipitated into the oil and discharged therewith, and means discharging water from the tank.

4. In a separator for oil, gas and water mixtures, the combination of a receiving container having an influent inlet spaced a substantial distance above the normal liquid level limit therein, a washing tank below the container having its upper end exposed to the bottom of the container, a conductor leading from the bottom of the container down to the lower portion of the tank for flowing liquids by gravity from the container to the tank, an upright overflow pipe in the container connected with the conductor and having a discharge orifice near the bottom of said container for maintaining a constant liquid level therein for cooling the bottom thereof, whereby a normal flow of liquids from the bottom of the container may be maintained and an excessive influx of influent in the container may be compensated, said conductor discharging into the lower portion of said tank, said tank containing a body of artificially heated water into which the liquids from the conductor are discharged, a separating unit in said tank and in said body of water for washing said influent liquids and extracting the water therefrom, means for discharging water from said tank, and means for discharging oil from the tank above the water level.

5. In a separator for oil, gas and water mixtures, the combination of a receiving container having an influent inlet spaced a substantial distance above the normal liquid level limit therein, a washing tank below the container having its upper end exposed to the bottom of the container, a conductor leading from the bottom of the container down to the lower portion of the tank for flowing liquids by gravity from the container to the tank, means coacting with the conductor for maintaining a constant accumulation of liquids in said container for cooling the bottom thereof, means coacting with the conductor and the container for discharging an abnormal flow of influent from the container before the liquid level rises to the influent inlet, said conductor discharging into the lower portion of said tank, said tank containing a body of artificially heated water into which the liquids from the conductor are discharged, a separating unit in said tank and in said body of water for washing said influent liquids and extracting the water therefrom, means for discharging water from said tank, and means for discharging oil from the tank above the water level.

6. In a separator for oil, gas and water, the combination of a receiving container of sufficient capacity to store an excessive surge of well influent, an inlet for the well influent near the top of the container, a gas outlet in the top of the container, a washing tank below the container having its upper end exposed to the bottom of the container, a conductor leading from the bottom of the container to the lower portion of the tank for flowing liquids by gravity, means for regulating the flow of liquids through the conductor from the container to maintain a constant accumulation of liquids in said container for cooling the bottom thereof, means located below the influent inlet for discharging an excessive surge of well influent from the container, said conductor discharging into the lower portion of said tank, said tank containing a body of artificially heated water into which the liquids from the conductor are discharged, a separating unit in said tank and in said body of water for washing said influent liquids and extracting the water therefrom, means for discharging water from said tank, and means for discharging oil from the tank above the water level.

JAY P. WALKER.